Aug. 28, 1962  G. D. SIMONDS ET AL  3,050,963
DOUBLE UNIVERSAL JOINT
Filed Dec. 17, 1959  2 Sheets-Sheet 1
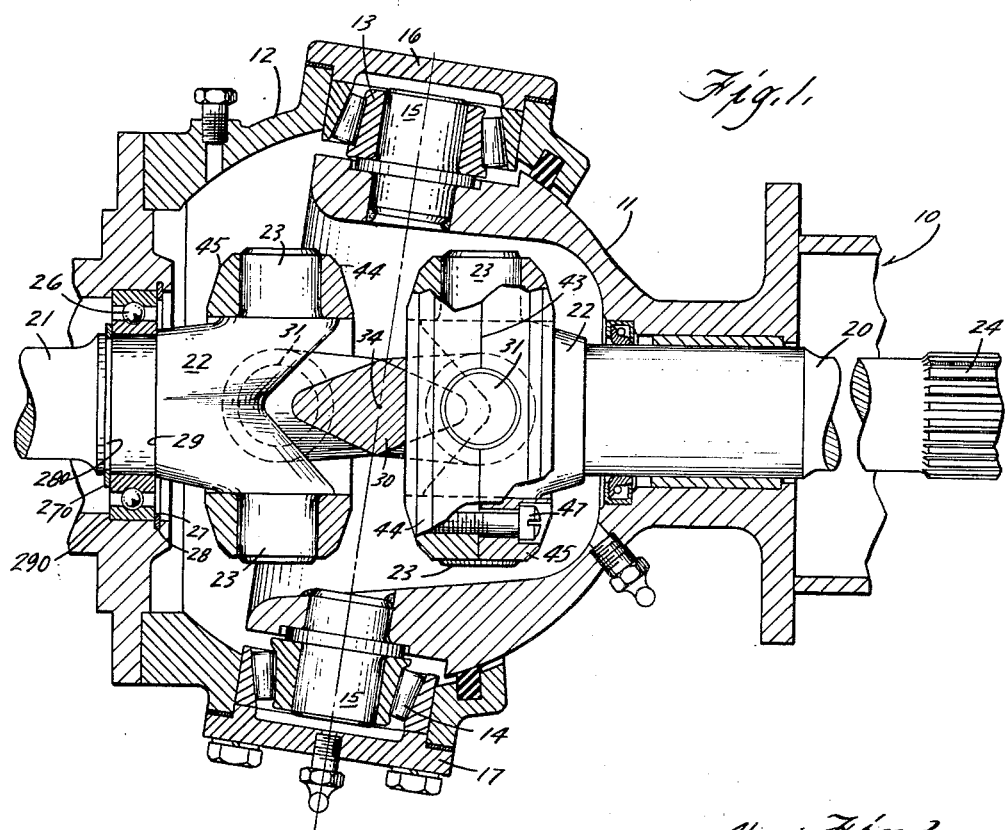
Fig. 1.
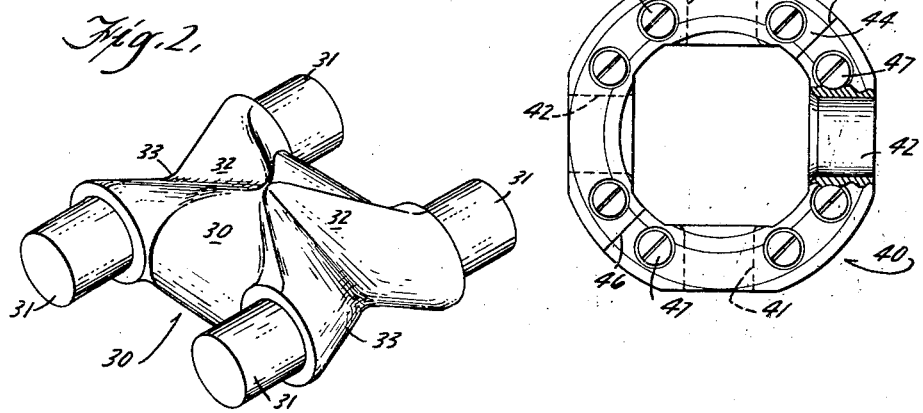
Fig. 2.
Fig. 3.
INVENTORS
GEORGE D. SIMONDS
ROBERT W. STIEG
ARNE V. LARSON
KENNETH A. McLYMAN
BY Wheeler, Wheeler + Wheeler
ATTORNEYS.

INVENTORS
GEORGE D. SIMONDS
ROBERT W. STIEG
ARNE V. LARSON
KENNETH A. MCLYMAN
BY Wheeler, Wheeler & Wheeler
ATTORNEYS.

United States Patent Office 3,050,963
Patented Aug. 28, 1962

3,050,963
DOUBLE UNIVERSAL JOINT
George D. Simonds, Robert W. Stieg, Kenneth A. McLyman, and Arne V. Larson, Clintonville, Wis., assignors to FWD Corporation, Clintonville, Wis., a corporation of Wisconsin
Filed Dec. 17, 1959, Ser. No. 860,207
3 Claims. (Cl. 64—21)

This invention relates to an improved double universal joint with reduced rotational vibration.

The objectives of the invention are to provide an improved joint of the constant velocity type having the ability to transmit more torque in a joint occupying a given space than previously known joints of this type. It is especially useful in a driving and steering axle, since the steering joint of such an axle tends to be extremely bulky in order to accommodate the universal joint in the drive shaft and the bulk is increased when joints which reduce rotational vibration are used. The speed of the output shaft should of course be as nearly constant as practical, within space and cost limitations.

The joint of the invention comprises heads on the driving and driven shafts, each provided with opposed radial bearing studs, annular force-transmitting elements respectively enclosing radial bearing studs on the driving and driven shafts, and a central H-shaped force transmitting member having similar bearing studs at its four ends connecting it to both annular members, the H-shaped member and the driving and driven members each being provided with V-shaped notches for clearance, and the annular members being beveled for clearance. It may further comprise a joint whose center is displaced from the kingpin axis to improve its performance when one shaft of the joint is axially fixed.

FIG. 1 is a longitudinal cross-sectional view, partially in full and partially broken away, of the steering joint of a driving and steering axle, showing my improved constant velocity joint.

FIG. 2 is a perspective view of the central member of my universal joint.

FIG. 3 is a plan view of an annular force-transmitting member of my universal joint.

Figure 4:
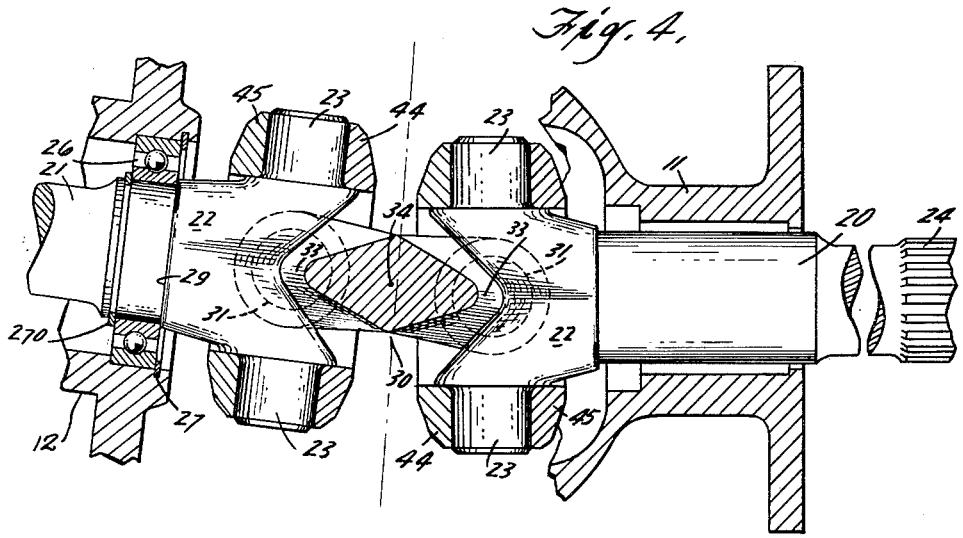
FIG. 4 is a cross sectional view of my improved universal joint showing the geometric center of the center member displaced from the kingpin axis toward the bearing at the left of the figure.

For the purpose of illustrating the contemplated use of my universal joint, it is shown in connection with an axle 10, which is provided with a steering ball comprising an inner part 11 and an outer part 12. Bearings 13 and 14 on studs 15 define the axis about which the wheel is turned. Studs 15 support the inner ball in the outer ball through bearings 13 and 14, and upper cap 16 and lower cap 17 are provided for retention, and removal if necessary, of bearings 13 and 14.

Figure 5:
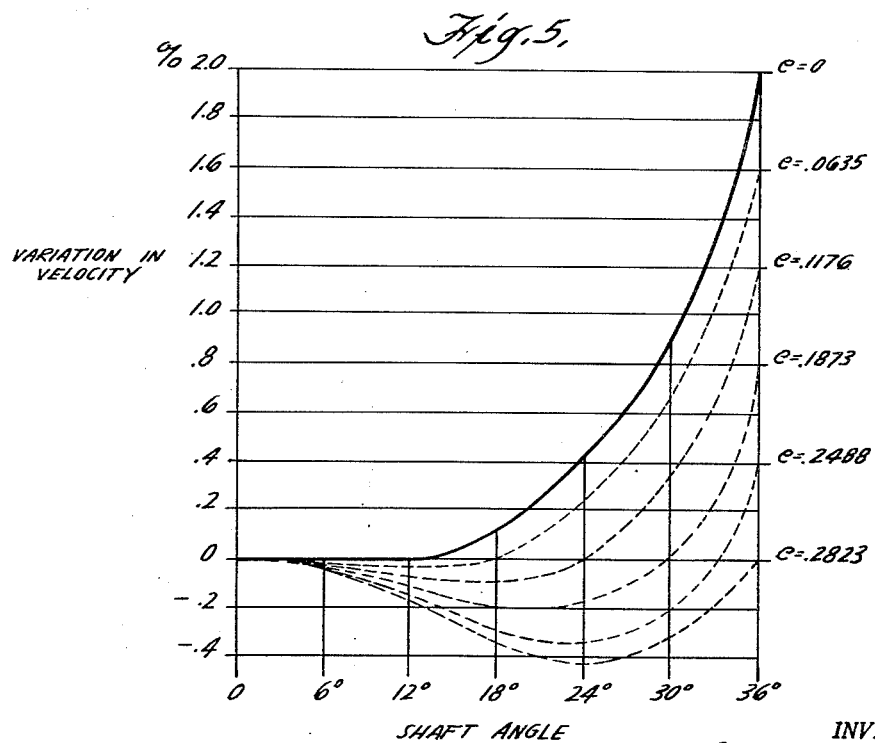
FIG. 5 is a graph showing the effect upon rotational vibration of the distance between the kingpin axis and the geometric center of the center member.

Driving shaft 20 is splined at 24 to the differential side gear (not shown) to accommodate changes in length in the universal joint. Driven shaft 21 is secured against axial movement with respect to ball 12 by bearing 26, which is held by snap ring 270 in groove 280 against shoulder 29 of head 22. At its outer margin shoulder 290, snap ring 27, and groove 28 secure the bearing against movement respecting the housing. Thus shaft 21 is fixed to the steerable portion of the housing, and shaft 20 must slide on splines 24 to accommodate changes in length during steering. This means that the geometric center 34 of center member 30 is not always precisely on the bisector of the angle formed by the axes of shafts 20 and 21, which bisector passes through the axis of kingpins 15. A small deviation from constant velocity is thus introduced, which may be minimized by placing 34 very slightly to one side of the kingpin axis when the shafts are aligned, as shown in FIG. 4 so that as housing 12 is turned around the kingpin axis, 34 must first approach and cross the kingpin axis and then recede on the other side. Since rotational vibration increases with the angle between the shafts, and decreases with the approach of point 34 to the kingpin axis, the errors are subtractive while the angle of the shafts is less than a predetermined angle at which output velocity is constant, as center 34 is on the bisector of the shaft angle, which passes through the kingpin axis. Thus the magnitude of the vibration is kept very low except for extreme shaft angles which are possible only at low speeds, at which such vibration is negligible in its effects. FIG. 5 is a graph showing the percentage of variation of velocity plotted against shaft angle. The distance of point 34 from the kingpin axis in inches is shown at the right for a joint in which point 34 is five inches from the trunnion axes of the center member.

My universal joint connects drive shaft 20 and driven shaft 21. Identical opposed ends 22 are provided on shafts 20 and 21. Each of the heads 22 is provided with a pair of opposed radial trunnions 23 which are all in a common plane when the shafts 21 and 20 are aligned. Between the trunnions is an axially deepening V-shaped trough on each side of the head, having its apex extending longitudinally, and forming a laterally V-shaped end at the intersection of like troughs.

A central force transmitting member 30, best shown in FIG. 2, is provided with opposed pairs of trunnions 31 on a pair of axes in a common plane, making it somewhat H-shaped in plan. Between each pair of trunnions 31, the top and bototm sides of member 30 are relieved by longitudinal axially deepening V-shaped notches, as shown at 32, which intersect to form a lateral V 33 at each end of member 30. Member 30 is bilaterally symmetrical in the longitudinal, transverse and vertical planes. Notches 32 give member 30 a diamond shaped cross section at the longitudinal center line, as shown in FIG. 1, the diamond being outlined by the apices of the four notches.

Trunnions 23 on driving shaft 20 are in force transmitting connection with trunnions 31 on central member 30 through annular members 40, each of which is provided with bores 41 on one diameter to receive trunnions 23, and with bores 42 on a second diameter at right angles to bores 41 to receive trunnions 31. Annular members 40 are split on plane 43 into annular rings 44 and 45 and ring 44 is further split into two semi-circles at plane 46, bisecting the angle between the bores 41 and 42 to permit assembly of member 40 about the trunnions. Rings 44 and 45 are secured together by means of bolts 47, a bolt being used between split 46 and a bore 41 or 42, and two bolts being used between bores not separated by plane 46. Other fastening means capable of withstanding the forces tending to separate the rings 44 and 45 may be used. These forces are relatively small compared to the total torque which is transmitted from trunnions 23 to trunnions 31, because the transmission of force is directly in line with surface 43 and is equal through each of rings 44 and 45. Furthermore, there is very little camming force exerted by studs 23 and 31 on rings 44 and 45 because at the intersection of plane 43 with bores 41 and 42, the sides of bores 41 and 42 are substantially at right angles to the applied force.

The driven end of the universal joint is identical with the driving end, with the exception that the driven shaft extends in the opposite direction from the joint to form a continuation of the drive train, and is restrained from axial movement.

The word aligned as used herein includes a parallel condition as well as a linear condition.

We claim:

1. A multiple universal joint comprising driving and driven shafts, a housing enclosing said joint consisting of two parts hingedly related for oscillation about an axis, one of said shafts being axially fixed with respect to one part of said hinged housing, and the other of said shafts being axially movable with respect to the other part of said housing, each said shaft being provided with a pair of opposed trunnions, a central member comprising a body and two pairs of opposed trunnions, an annular member connecting each said pair of shaft trunnions with a said pair of trunnions on said central member, said shafts having axes which intersect at a vertex, the geometric center of the central member coinciding with a line intersecting said axes at equal angles when said axes have a predetermined angular relationship to each other, said geometric center of said central member being displaced from said line intersecting said axes at equal angles when said shafts are co-axially aligned.

2. A multiple universal joint comprising driving and driven shafts, a housing enclosing said joint consisting of two parts hingedly related for oscillation about an axis, one of said shafts being axially fixed with respect to one part of said hinged housing, and the other of said shafts being axially movable with respect to the other part of said housing, each said shaft being provided with a pair of opposed trunnions, a central member comprising a body and two pairs of opposed trunnions, an annular member connecting each said pair of shaft trunnions with a said pair of trunnions on said central member, the geometric center of the central member coinciding with a line intersecting said shafts at equal angles when said shafts have a predetermined angular relationship to each other, said annular members being provided with annular bevels on their facing margins whereby to increase the angle at which the shafts may be placed and to provide a pair of surfaces which may touch without damage.

3. In a multiple universal joint, the combination with a pair of shafts having support means carrying them for rotation about their axes, one of said shafts having means fixing it against axial displacement with respect to said support means and the support means of the other shaft accommodating relative axial displacement of said shaft, a pair of series-connected universal joints operatively connected with said shafts and having a common central member between said shafts, means defining an axis for oscillation of one support means with respect to the other said support means, said means mounting said one shaft and its support means for bodily oscillatory movement about said axis and through a range of positions in which said central member rotates upon an axis intermediate the axes of said shafts and the axes of the respective shafts are angularly related to the axis of said central member, the geometrical center of said central member lying in a line which intersects the axes of said shafts at equal angles in one position of relative angular adjustment of said shafts within said range, and said center being offset from said line in another position of relative angular adjustment of said shafts within said range.

References Cited in the file of this patent

UNITED STATES PATENTS

| | | |
|---|---|---|
| 887,184 | Brewer | May 12, 1908 |
| 1,868,282 | Feightner | July 19, 1932 |
| 1,959,859 | Donley | May 22, 1934 |
| 1,981,173 | Herrington | Nov. 20, 1934 |
| 2,042,513 | Daniell | June 2, 1936 |
| 2,303,180 | Swenson | Nov. 24, 1942 |
| 2,494,324 | Wright | Jan. 10, 1950 |
| 2,605,853 | Swenson | Aug. 5, 1952 |